United States Patent
Khuu

[11] Patent Number: 6,081,407
[45] Date of Patent: *Jun. 27, 2000

[54] COVER SPRINGS FOR POSITIONING A REMOVABLE VIDEO DISK CARTRIDGE

[75] Inventor: Hong Khuu, Fremont, Calif.

[73] Assignee: Castlewood Systems, Inc., Pleasanton, Calif.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/970,305

[22] Filed: Nov. 14, 1997

[51] Int. Cl.[7] ............................. G11B 17/04; G11B 33/02
[52] U.S. Cl. ..................................... 360/99.06; 369/77.2
[58] Field of Search ............................. 360/99.06, 99.02, 360/97.01; 369/77.2

[56] References Cited

U.S. PATENT DOCUMENTS

| | | | |
|---|---|---|---|
| 4,504,879 | 3/1985 | Toldi et al. | 360/99.06 |
| 4,841,394 | 6/1989 | Tomizawa et al. | 360/99.06 |
| 4,870,518 | 9/1989 | Thompson et al. | 360/99.06 |
| 4,953,042 | 8/1990 | Yoshikawa | 360/99.06 |
| 4,965,691 | 10/1990 | Iftikar et al. | 360/133 |
| 4,974,103 | 11/1990 | Iftikar et al. | 360/133 |
| 5,113,297 | 5/1992 | Yoshida | 360/99.06 |
| 5,204,793 | 4/1993 | Plonczak | 360/99.06 |
| 5,317,464 | 5/1994 | Witt et al. | 360/99.08 |
| 5,341,260 | 8/1994 | Jabbari | 360/105 |
| 5,416,762 | 5/1995 | Ohmori et al. | 360/99.06 |
| 5,440,436 | 8/1995 | Iftikar et al. | 360/133 |
| 5,444,586 | 8/1995 | Iftikar et al. | 360/133 |
| 5,570,252 | 10/1996 | Sumner et al. | 360/99.06 |
| 5,617,397 | 4/1997 | Jones et al. | 369/772 |
| 5,625,612 | 4/1997 | Tozune et al. | 360/99.06 |
| 5,648,944 | 7/1997 | Ohmori et al. | 369/77.2 |
| 5,675,566 | 10/1997 | Kosaka et al. | 369/77.2 |
| 5,809,520 | 9/1998 | Edwards et al. | 360/97.01 |
| 5,841,605 | 11/1998 | Foster et al. | 360/97.01 |

*Primary Examiner*—Craig A. Renner
*Attorney, Agent, or Firm*—Townsend and Townsend and Crew LLP

[57] ABSTRACT

A device for properly aligning a removable hard disk cartridge with the moving parts and data transfer head of an associated disk drive. In particular, the device is for use in recording and archiving of digital video and other data. The device includes an integrated pair of elongate spring structures formed from a portion of a housing cover. The elongate springs are configured to extend from the cover to slidingly engage the removable hard disk cartridge. The springs fully constrain the position of the cartridge within the drive to avoid misalignment between the removable hard disk cartridge and the data transfer head and various other moving parts of the disk drive system.

16 Claims, 11 Drawing Sheets

COVER SPRINGS FOR POSITIONING A REMOVABLE VIDEO DISK CARTRIDGE

BACKGROUND OF THE INVENTION

The present invention is generally related to recording systems for digital video and other data, and in particular, provides a mechanism for urging a hard disk cartridge into a receptacle within a disk drive system. Video Cassette Recorders ("VCRs") dominate the consumer video market, due in part to their combination of low cost and recording capabilities. VCR analog magnetic tape recording cassettes can be used to record, play-back, and store video images in a format which is well adapted for use with existing analog television signals. The ability to record allows consumers to use the standard VHS VCR to save television shows and home movies, as well as for play-back of feature films.

The structure of VCR systems and recording media are adapted to record and archive existing television signals. Specifically, a large amount of analog data is presented on a standard television screen during a standard length feature film. VCR systems record this analog data using analog recording media. The VCR recordings can be removed from the recording/play-back equipment for storage, thereby minimizing the system costs when large numbers of movies are stored.

While VCR systems successfully provide recording and archive capabilities at low cost, these existing consumer video systems have significant disadvantages. For example, accessing selected portions of a movie stored on a VCR tape can be quite slow. In particular, the cassette must be rewound to the beginning of the movie between each showing, which can involve a considerable delay. Additionally, transferring data to and from the tape takes a substantial amount of time. Although it would be beneficial to provide high speed accessing and transfer of the video data, this has remained a secondary consideration, as movies are typically recorded and played by the consumer in real time. Alternatives providing faster access are commercially available (for example, optical video disks), but these alternatives generally have not been able to overcome the VCR's low cost and recording capabilities.

Recent developments in video technology may further decrease the VCR's advantages over alternative systems. Specifically, standard protocols have recently been established for High Definition TeleVision ("HDTV") signals. The digital data presented in a single HDTV feature film using these protocols can represent a substantial increase over existing VCR system capacities. While digital video cassette tapes are available, these modified versions of existing analog VCR systems do not appear to have sufficient storage capacity for a feature film in all of the proposed HDTV formats. Optical disks can accommodate these larger quantities of digital data. Unfortunately, despite many years of development, a successful low cost optical recording system has remained an elusive goal.

Personal computer magnetic data storage systems have evolved with structures which are quite different than consumer video storage systems. Modern personal computers often include a rigid magnetic disk which is fixed in an associated disk drive. These hard disk drive systems are adapted to access and transfer data to and from a recording surface of the disk at high speeds. It is generally advantageous to increase the total data storage capacity of each hard disk, as the disks themselves are typically fixed in the drive system. Hence, much of the data that is commonly used by the computer is stored on a single disk.

The simplicity provided by such a fixed disk drive system helps maintain overall system reliability, and also helps reduce the overall storage system costs. Nonetheless, removable hard disk cartridge systems have recently become commercially available, and are now gaining some acceptance. While considerable computer data can be stored using these removable hard disk cartridge systems, their complexity, less than ideal reliability, and cost has limited their use to selected numbers of high-end personal computer users.

One particular disadvantage of known removable hard disk computer storage systems is the complexity of the structure used to ensure that the removable cartridge is properly received into the surrounding disk drive. The cartridge housing must be positioned such that the data transfer head of the drive can move freely along the recording surface of the rotating disk. To hold the cartridge housing with sufficient accuracy to accommodate the moving parts of the drive, known removable disk drive housing generally incorporate complex spring devices or other actuated biasing mechanisms. These structures typically make use of biasing mechanisms which are manufactured separately from the housing. This requires that the parts be fastened to the housing by bolting, riveting, or welding. These structures increase the manufacturing complexity and cost of the disk drive system. Moreover, failure of the fasteners may result in, not only the misalignment of the cartridge and housing, but damage being done to the disk cartridge by a loose fastener or spring.

In light of the above, it would be desirable to provide improved data storage systems, devices, and methods for storing video and other data. It would be particularly desirable if these improved systems, devices and methods were adapted for digital video data such as the new HDTV protocols, and had the ability to record, archive, and access digital feature films with good reliability and at a low system cost. It would be especially desirable to provide alternative cartridge biasing structures which are structurally integrated into the housing and are capable of urging the cartridge into proper alignment with sufficient accuracy to accommodate alignment with the moving parts of a disk drive system.

SUMMARY OF THE INVENTION

The present invention provides an improved support structure for urging proper alignment between a removable hard disk cartridge and the moving parts and data transfer head of an associated disk drive, particularly for use in recording and archiving of digital video and other data. In contrast to the complex biasing mechanisms of known removable hard disk systems, the present invention makes use of an integrated pair of elongate spring structures, formed from a portion of the housing cover. Because the elongate springs are formed directly from the cover material, the need for fastening mechanisms is eliminated. These simple elongate springs are configured to extend from the cover to slidingly engage the disk cartridge. The springs will constrain the position of the cartridge within the drive so as to avoid misalignment between the disk cartridge and the data transfer head or various other moving parts. Ideally, the springs will further encourage even advancement of the disk cartridge as it is placed into the drive system.

In a first aspect, the present invention provides a system for recording and archiving digital video and other data. The system comprises a cartridge having a hard recording disk. The system further provides a disk drive which has a receptacle which removably receives the cartridge. The disk drive also comprises a cover which has at least one integral cover spring which urges the cartridge into the receptacle.

In another aspect, the present invention provides a disk drive for use with a removable hard disk cartridge. The disk drive comprises a housing having a receptacle which removably receives the cartridge. The housing has a cover, formed of a cover material, which has at least one opening. The opening defines a spring of the cover material. The spring extends, preferably in cantilever, from the cover toward the receptacle so as to urge the cartridge into the receptacle when the cartridge is disposed within the housing. Preferably, the cover spring is adapted to slidingly engage the cartridge to facilitate insertion and removal of the cartridge from the receptacle. Advantageously, the cover has two spring defining openings opposed relative to an axis of insertion of the cartridge. The two springs have proximal ends adjacent the surrounding cover, and distal ends extending toward the receptacle. Adjacent the distal ends are protrusions which are adapted to resist introduction of the cartridge. This configuration of the two opposed springs promotes even advancement of the cartridge relative to the axis of insertion.

In another aspect, the present invention provides a method for fabricating a disk drive for use with removable hard disks. The method comprises integrally forming a cover and cover springs so that the cover springs can urge the cartridge into a receptacle of the disk drive.

DESCRIPTION OF THE PREFERRED EMBODIMENT

The devices, systems, and methods of the present invention generally make use of low cost, stamped sheet metal support structures in disk drive systems having removable hard disk cartridges. Stamped sheet metal can provide cartridge positioning surfaces, insertion guide surfaces, and component mounting pads (for adjustably mounted components) at a fraction of the cost of a machined disk drive base. The cartridges used with these disk drives will preferably contain a single two-sided rigid magnetic recording disk which is capable of storing at least about 2.4 gigabytes of data, ideally being capable of storing at least about 4.7 gigabytes of data. These devices and methods will find applications for storing a wide variety of data for use with notebook computers, desktop computers, and more powerful computer workstations. The cartridges, the disk drive systems, and the fabrication tools and methods of the present invention are particularly well suited for use in recording, archiving, and playing back digital video data, for fabricating video storage systems. Due to the low cost, large capacity, and archivability provided by the recording system of the present invention, a standard length movie in AMPAC I or AMPAC II format (as suitable for high definition television "HDTV") may be stored using no more than two cartridges, and ideally may be stored on a single cartridge having a single, two sided hard disk.

Figure 1:
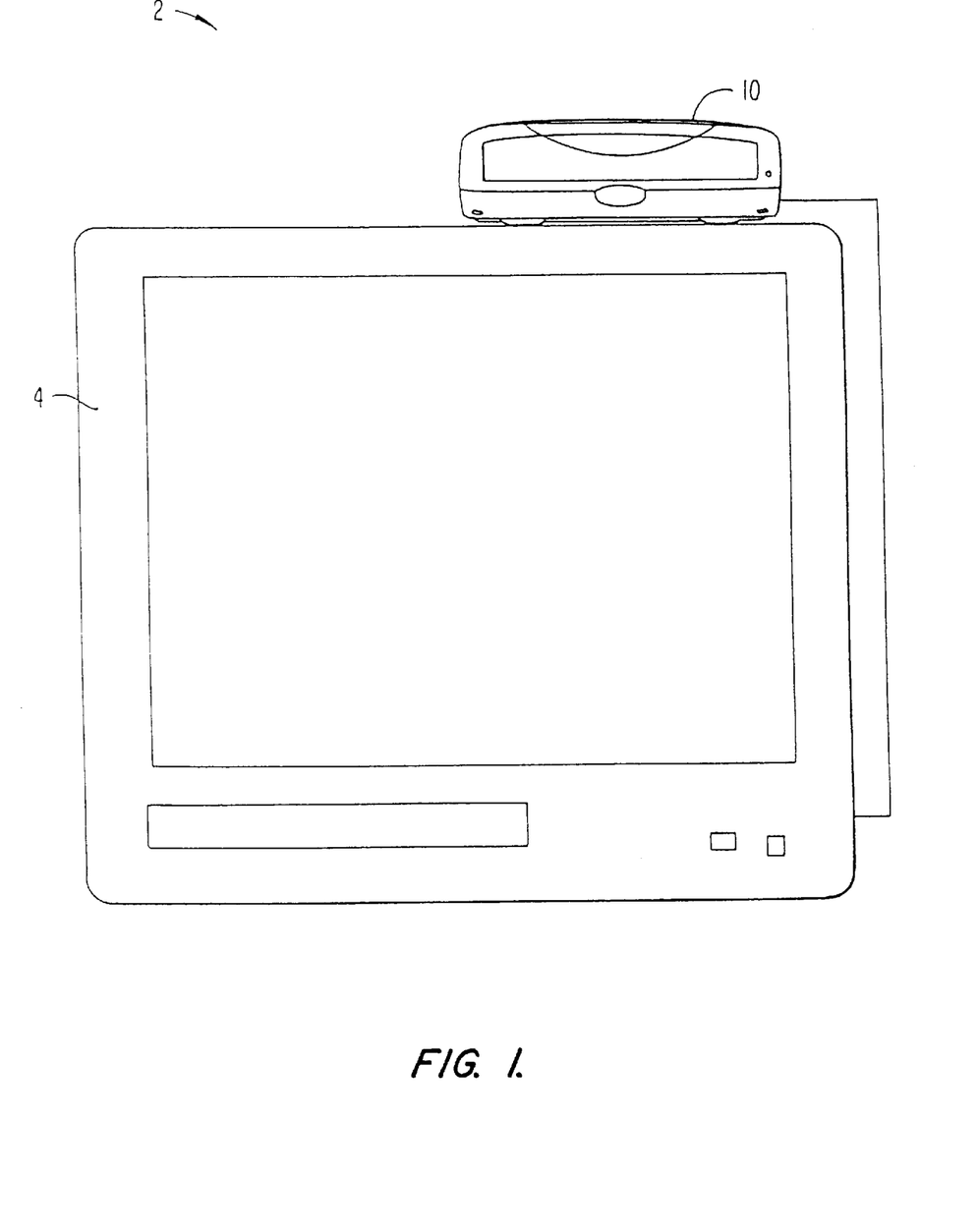
FIG. 1 is a schematic illustration of a video system including a high definition television and an external disk drive.

As schematically illustrated in FIG. 1, a video system 2 includes a high definition television 4 which is coupled to an external disk drive 10. External drive 10 will read recorded digital data from a removable disk cartridge, and will transmit that data to HDTV 4, preferably using one of the standard digital formats or protocols now being established. No general purpose computer need be coupled between external drive 10 and HDTV 4, although such a general purpose computer may be incorporated into video system 2 to allow flexible manipulation of the video data. In the exemplary embodiment, external drive 10 is less than 2 in. by less than 5½ in. by less than 7 in. The small size of the drive (and the small size of the disks on which the movies are stored) helps decrease the overall space which is required for video systems and the associated movie library.

Figure 1A:
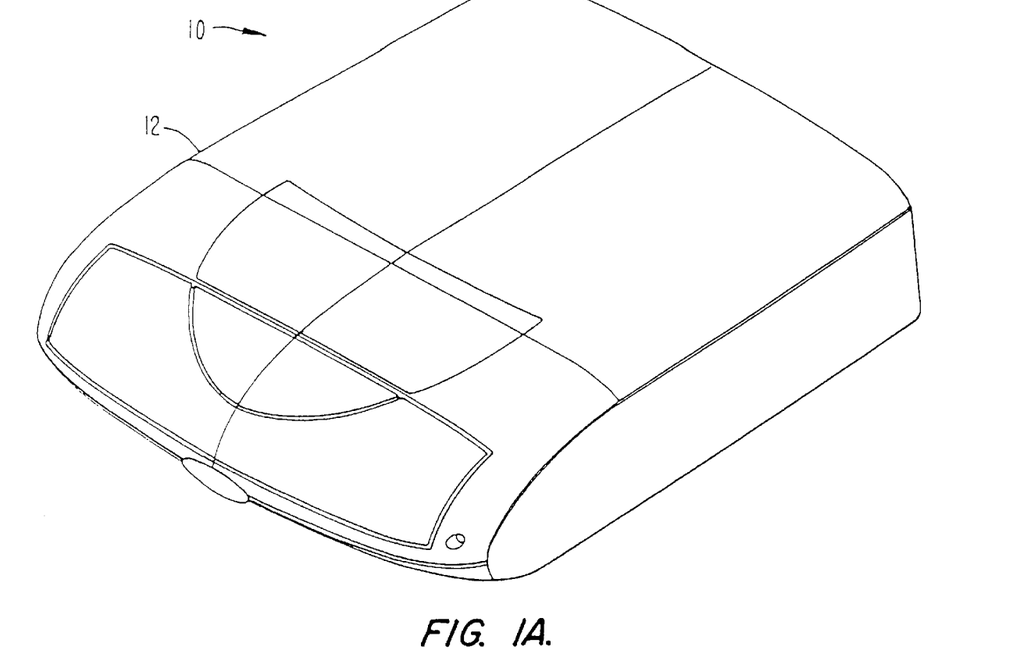
FIG. 1A is a perspective view of an external disk drive for use with a removable rigid recording disk cartridge, according to the principles of the present invention.
Figure 1B:
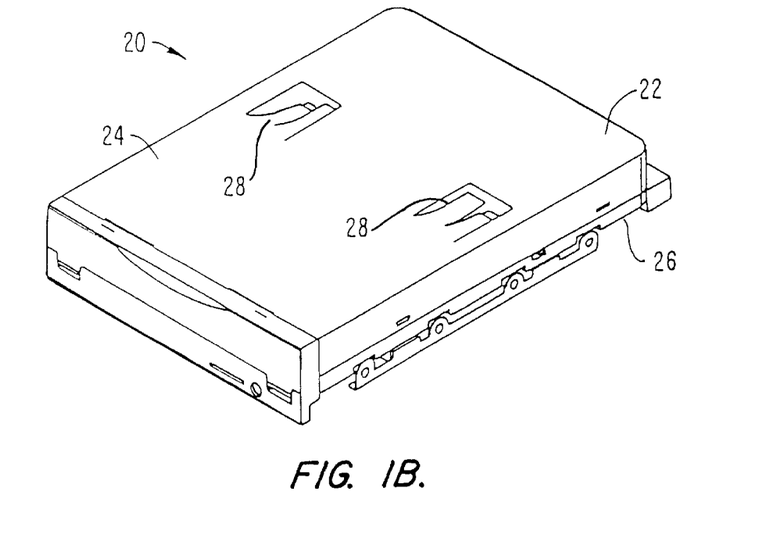
FIG. 1B is a perspective view of an internal disk drive similar to the external drive of FIG. 1, in which the internal drive is adapted for insertion into a standard bay of a computer.

Referring now to FIGS. 1A and 1B, external disk drive 10 and internal disk drive 20 will share many of the same components. However, external drive 10 will include an enclosure 12 adapted for use outside a personal computer, high definition television, or some other data manipulation or display device. Additionally, external drive 10 will include standard I/O connectors, parallel ports, and/or power plugs similar to those of known computer peripheral or video devices.

Internal drive 20 will typically be adapted for insertion into a standard bay of a computer. In some embodiments, internal drive 20 may instead be used within a bay in a HDTV, thereby providing an integral video system. Internal drive 20 may optionally be adapted for use with a bay having a form factor of 2.4 inches, 1.8 inches, 1 inch, or with any other generally recognized or proprietary bay. Regardless, internal drive 20 will typically have a housing 22 which includes a housing cover 24 and a base plate 26. As illustrated in FIG. 1B, housing cover 24 will typically include integral springs 28 to bias the cartridge downward within the receiver of housing 22. It should be understood that while external drive 10 may be very different in appearance than internal drive 20, the external drive will preferably make use of base plate 26, cover 24, and most or all mechanical, electro-mechanical, and electronic components of internal drive 20.

Figure 2:
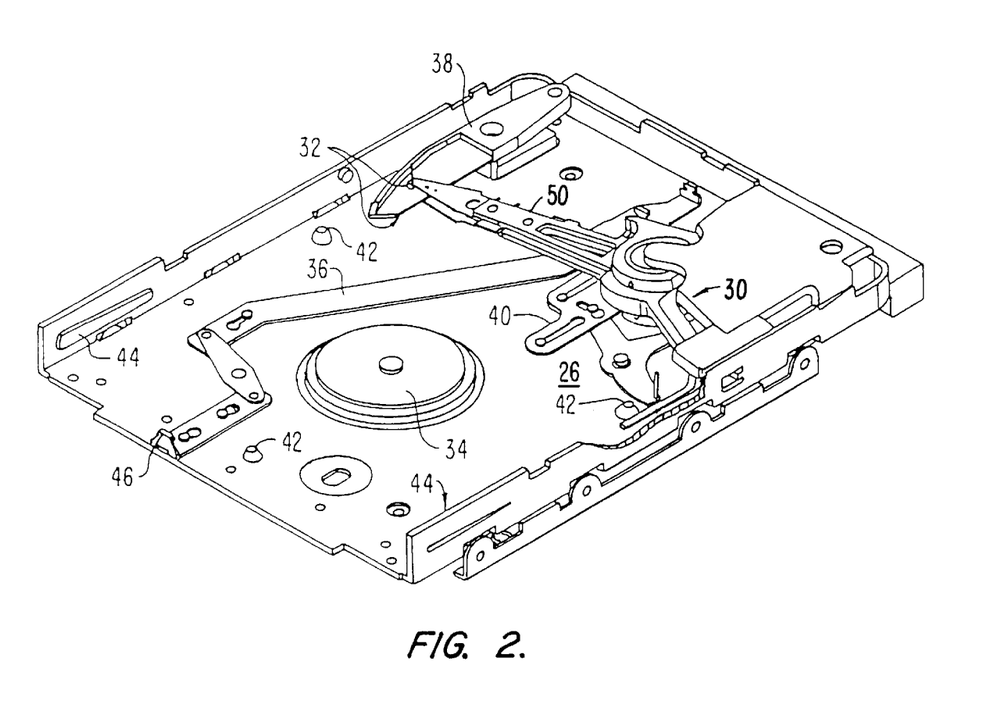
FIG. 2 is a perspective view of the internal disk drive of FIG. 1B, in which a cover of the disk drive has been removed to show a receptacle for the removable cartridge and some of the major disk drive components.

Many of the components of internal drive 20 are visible when cover 24 has been removed, as illustrated in FIG. 2. In this exemplary embodiment, a voice coil motor 30 positions first and second heads 32 along opposed recording surfaces of the hard disk while the disk is spun by spindle drive motor 34. A release linkage 36 is mechanically coupled to voice coil motor 30, so that the voice coil motor effects release of the cartridge from housing 22 when heads 32 move to a release position on a head load ramp 38. Head load ramp 38 is preferably adjustable in height above base plate 26, to facilitate aligning the head load ramp with the rotating disk.

A head retract linkage 40 helps to ensure that heads 32 are retracted from the receptacle and onto head load ramp 38 when the cartridge is removed from housing 22. Head retract linkage 40 may also be used as an inner crash stop to mechanically limit travel of heads 32 toward the hub of the disk.

Base 26 preferably comprises a steel sheet metal structure in which the shape of the base is primarily defined by stamping, the shape ideally being substantially fully defined by the stamping process. Bosses 42 are stamped into base 26 to engage and accurately position lower surfaces of the cartridge housing. To help ensure accurate centering of the cartridge onto spindle drive 34, rails 44 maintain the cartridge above the associated drive spindle until the cartridge is substantially aligned axially above the spindle drive, whereupon the cartridge descends under the influence of cover springs 28 and the downward force imparted by the user. This brings the hub of the disk down substantially normal to the disk into engagement with spindle drive 34. A latch 46 of release linkage 36 engages a detent of the cartridge to restrain the cartridge, and to maintain the orientation of the cartridge within housing 22.

Figure 3:
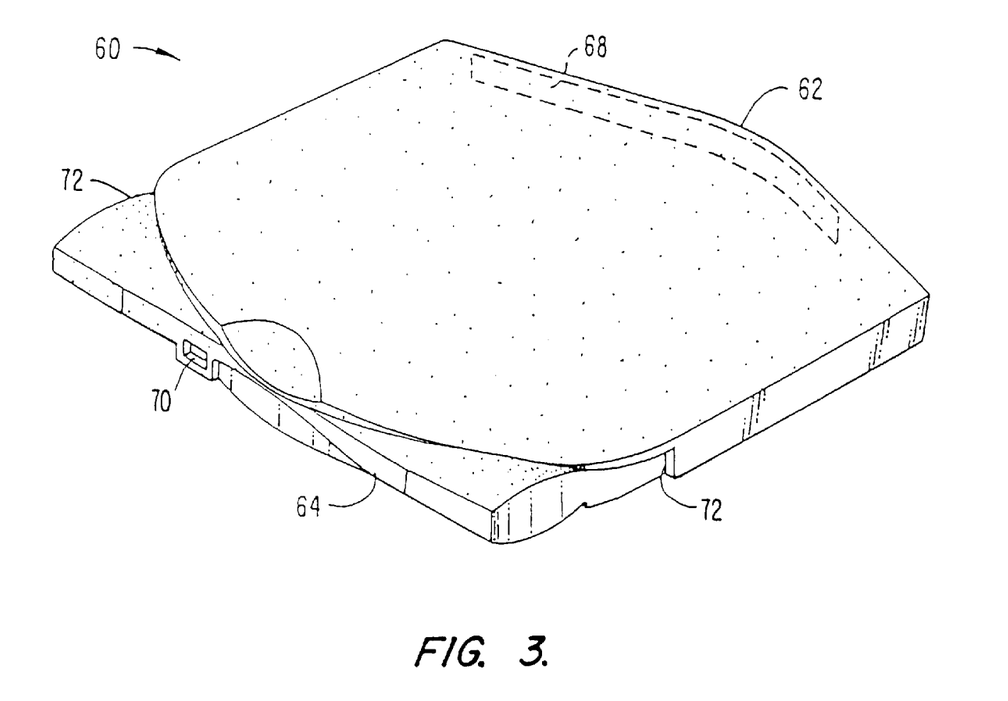
FIG. 3 is a perspective view of a removable cartridge housing a rigid magnetic recording disk.
Figure 3A:
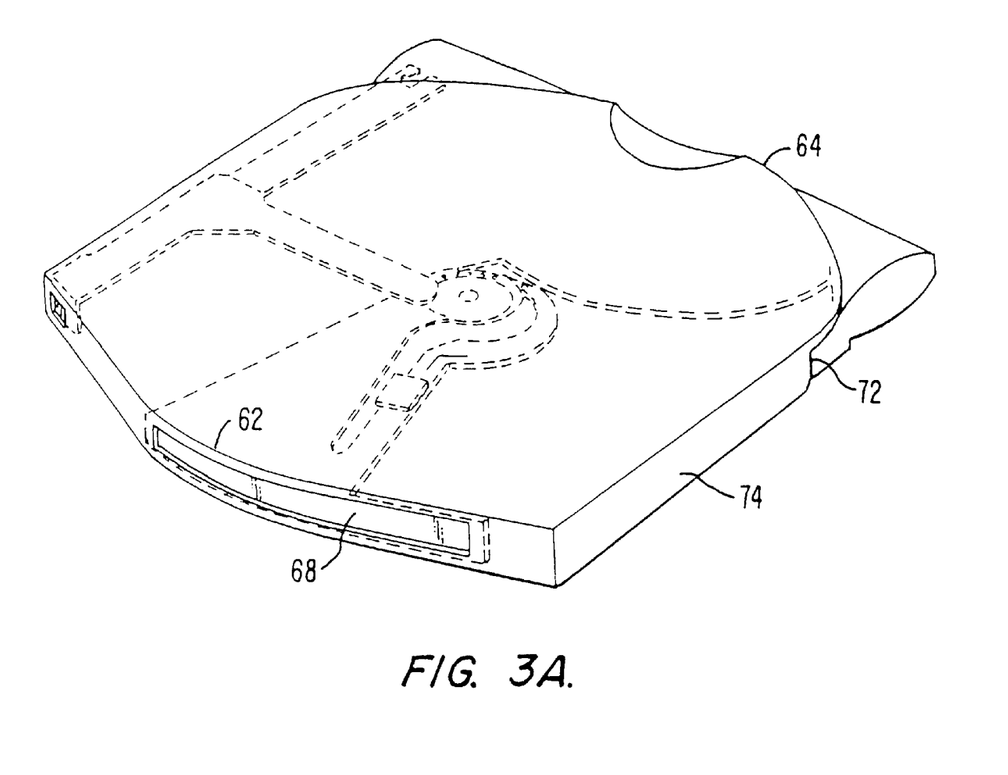
FIG. 3A is an alternative perspective view of the cartridge of FIG. 3, showing the door and door actuation mechanism.
Figure 7A:
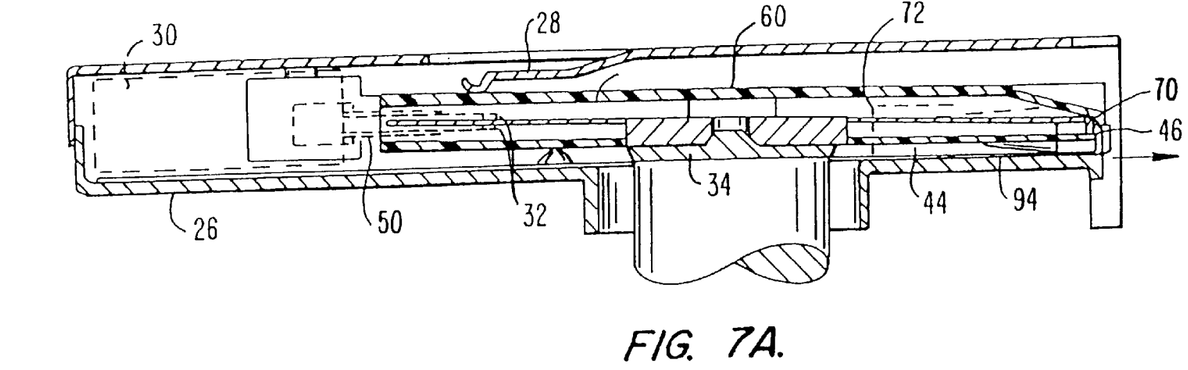
FIG. 7A is a cross-sectional side view of the cartridge of FIG. 3 fully inserted into the internal drive of FIG. 1B.
Figure 7B:
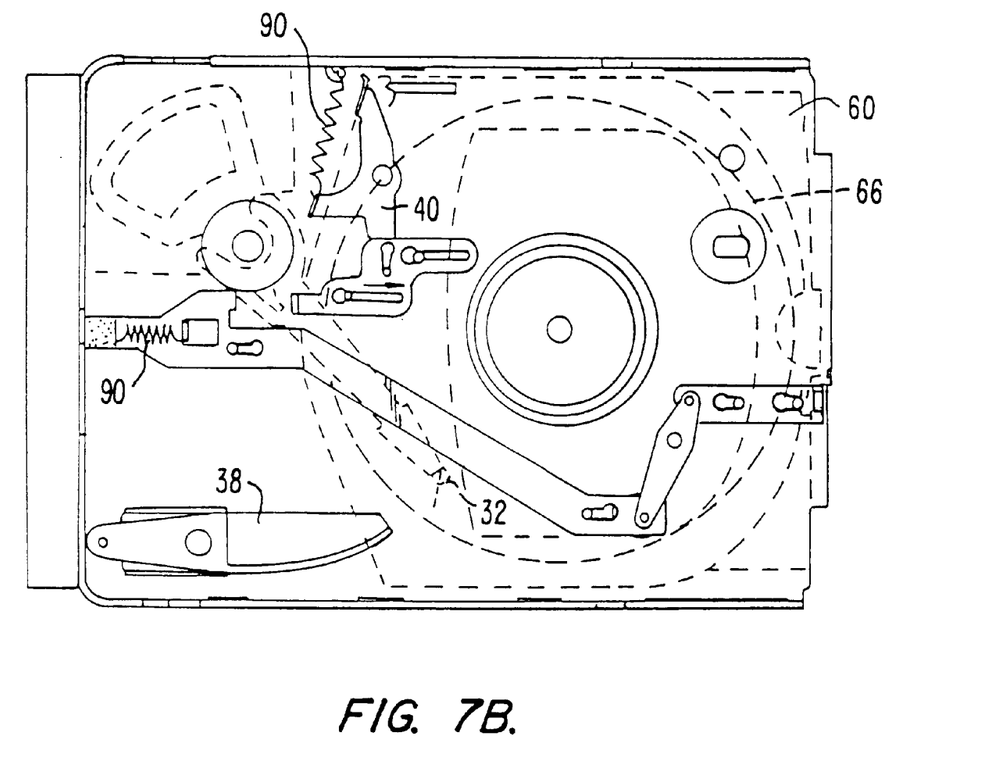
FIG. 7B is a top view of the cartridge inserted within the drive.

A cartridge for use with internal drive 20 is illustrated in FIGS. 3 and 3A. Generally, cartridge 60 includes a front edge 62 and rear edge 64. A disk 66 (see FIG. 7B) is disposed within cartridge 60, and access to the disk is provided through a door 68. A detent 70 along rear edge 64 of cartridge 60 mates with latch 46 to restrain the cartridge within the receptacle of the drive, while rear side indentations 72 are sized to accommodate side rails 44 to allow cartridge 60 to drop vertically into the receptacle. Optionally, a ridge may extend from rear edge of the cartridge to facilitate insertion and/or removal of the cartridge, and to avoid any interference between the housing surrounding the receptacle and the user's fingers. The door of the drive may include a corresponding bulge to accommodate such a ridge. An anti-rattle mechanism, ideally having a two-part arm (one portion comprising polymer molded integrally with the door, the other portion comprising a metal and extending from the polymer portion over the hub of the disk) prevents the disk from rattling within the cartridge when the cartridge is removed from the drive.

Figure 4:
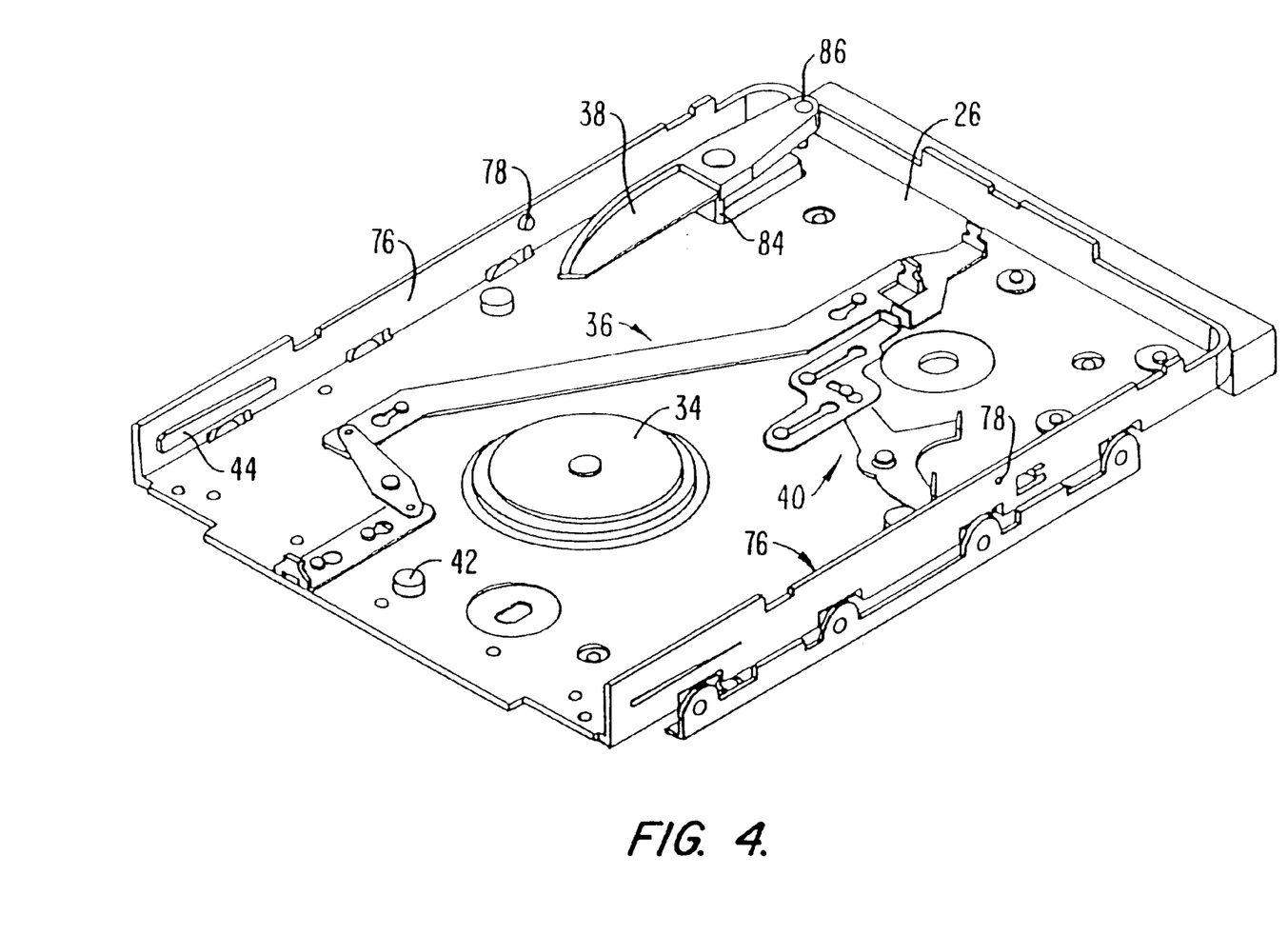
FIG. 4 is a simplified perspective view of the internal drive of FIG. 2, in which the voice coil motor and arm have been removed to show the cartridge release linkage and the head retract linkage.

Side edges 74 of cartridge 60 are fittingly received between side walls 76 of base 26, as illustrated in FIG. 4. This generally helps maintain the lateral position of cartridge 60 within base 26 throughout the insertion process. Stops 78 in sidewall 76 stop forward motion of the cartridge once the hub of disk 66 is aligned with spindle drive 34, at which point rails 44 are also aligned with rear indents 72. Hence, the cartridge drops roughly vertically from that position, which helps accurately mate the hub of the disk with the spindle drive.

Figure 5A:
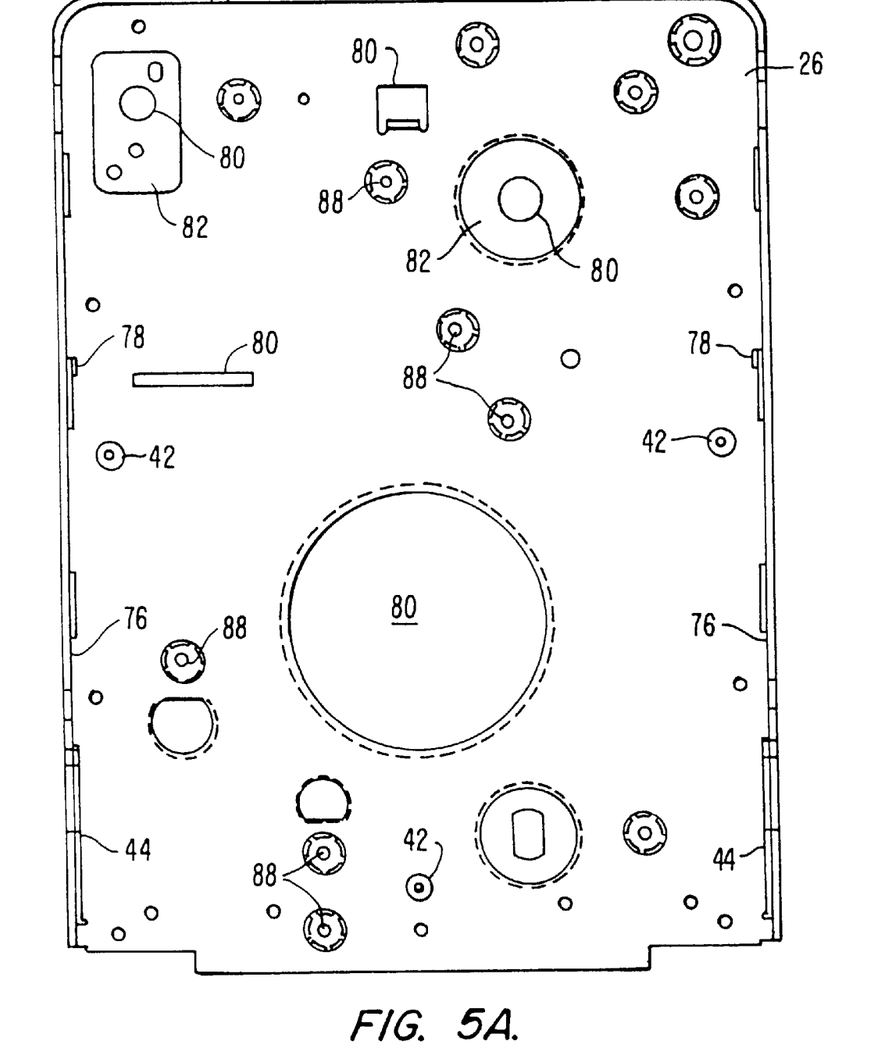
FIG. 5A is a top view of a base for the internal drive of FIG. 2, in which the base is substantially entirely formed from sheet stock in a single stamping process.
Figure 5B:
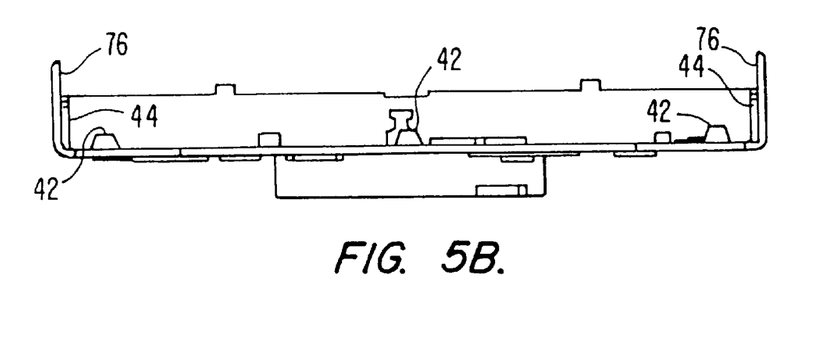
FIG. 5B is a front view of the base of FIG. 5A.
Figure 6A:
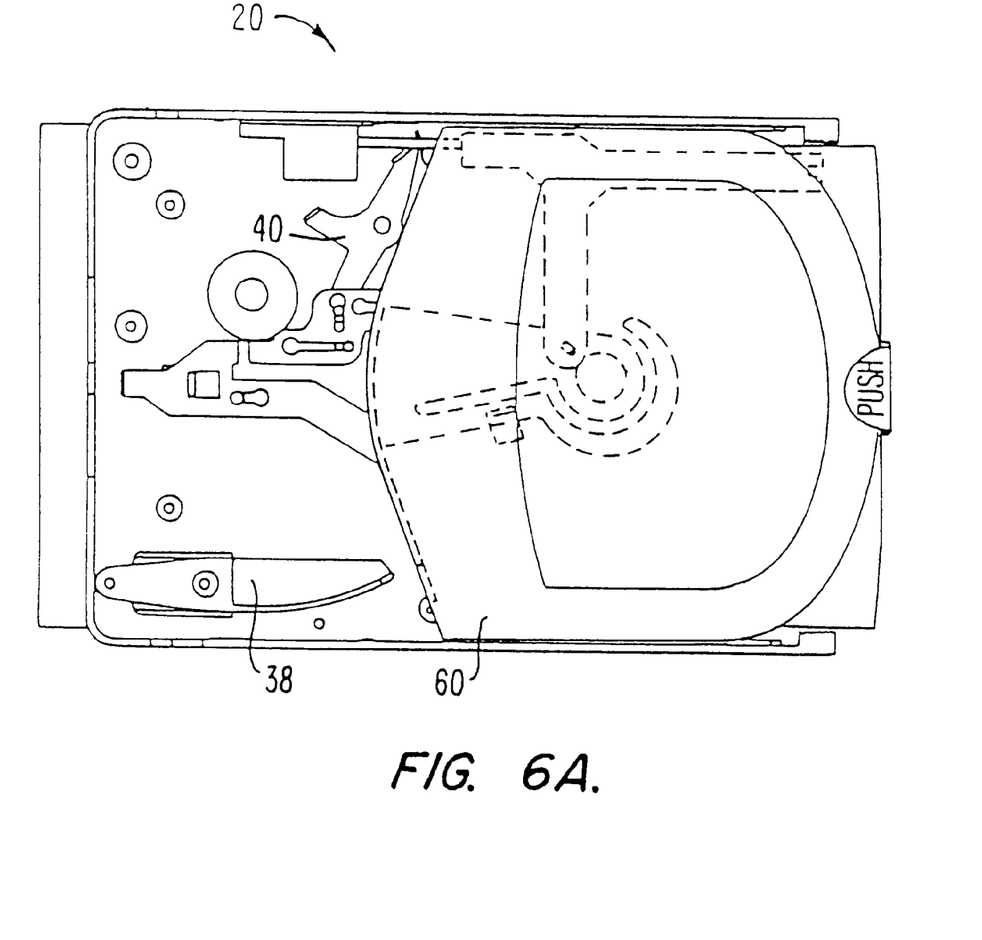
FIG. 6A is a top view of the internal drive of FIG. 1B, in which the cover has been removed to show insertion of the cartridge of FIG. 3 therein.
Figure 6B:
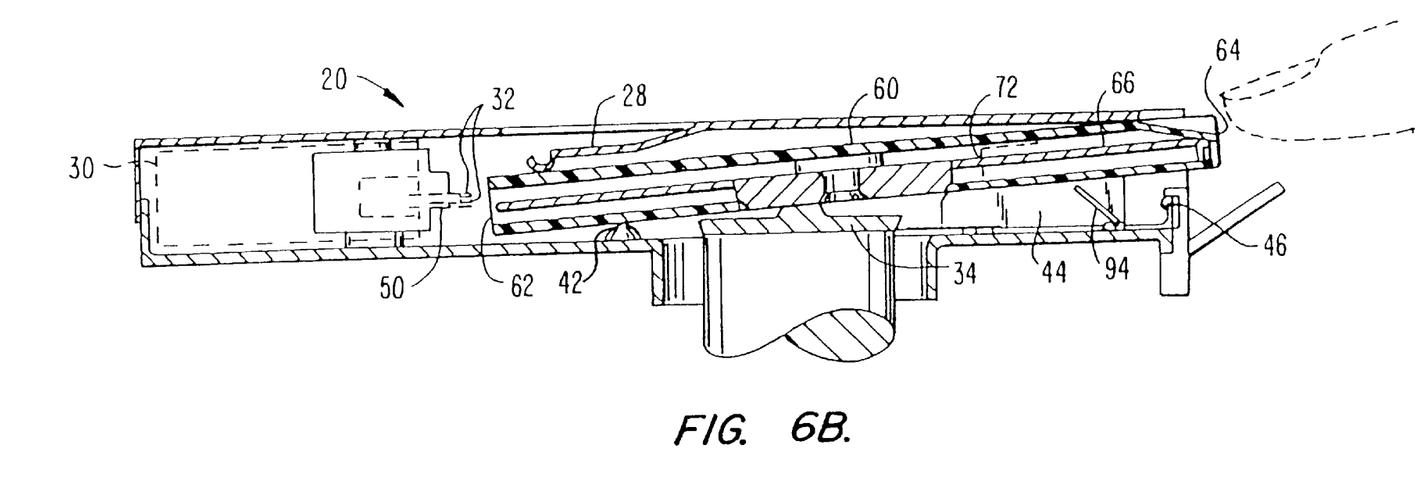
FIG. 6B is a cross-sectional side view of the cartridge being inserted into the internal drive of FIG. 1B.

The structure of base 26 can be seen most clearly in FIGS. 4, 5A, and 5B. Base 26 generally comprises a stamped sheet metal structure, ideally being formed of stainless steel. Openings 80 accommodate the spindle drive, data transmission cables, component mounting fasteners, and the like. Openings 80 are substantially formed during the stamping process, but may optionally be modified afterward to provide threaded openings, etc. Mounting pads 82 are also generally defined by the stamp tools, so that head load ramp 38, the head support structure (which generally includes voice coil motor 30 and head support arm 50, as illustrated in FIG. 2), and spindle drive 34 are substantially located relative to each other. Base 26 is more fully described in co-pending U.S. patent application Ser. No. 08/971,033 (Attorney Docket No. 18525-000600), filed concurrently herewith, the full disclosure of which is incorporated herein by reference.

Bosses 42 and side wall 76 are also formed by clamping the sheet metal stock between the male and female tool parts, while side rails 44 and stops 78 may be formed by independently movable tool portions. Hence, the cartridge engaging surfaces and component mounting pads are positioned on base 26 simultaneously during the relatively rapid stamping process, rather than individually machining each of these surfaces.

Once base 26 is stamped to shape, the various components may be mounted to the base to assembly the disk drive. Voice coil motor 30 and arm 50, which together support head 32 (see FIG. 2) are mounted directly to their associated pad 82. Spindle drive 34 will then be bonded to the base material which extends downward from its associated opening 80. The driving member will rotate about a fixed position, rather than telescoping axially to engage the disk within the cartridge. The position of the spindle drive assembly can be adjusted during the bonding process using a gauge to align the disk on the spindle drive with the motion of heads 32.

Head load ramp 38 is also mounted on an associated stamped pad 82 of base 26. The head load ramp will preferably flex about a central fulcrum 84. This facilitates adjustment of a height of the head load ramp over the base using a rear screw 86, as more fully described in co-pending U.S. patent application Ser. No. 08/970,282, filed concurrently herewith (Attorney Docket No. 18525-000800) and assigned to the present assignee, the full disclosure of which is incorporated herein by reference. This allows the height of the head load ramp adjacent the disk to be easily adjusted so as to smoothly transfer the heads between the recording surface and a "park" position along the head load ramp.

Also formed during the stamping process are linkage mounts 88. Release linkage 36 and head retract linkage 40 will be mounted to linkage mounts 88 using rivets or other fasteners which accommodate the sliding and/or pivoting of the linkage members, as appropriate.

Heads 32 will often be separated from the spinning recording surface by a thin layer of air. More specifically, the data transfer head often glides over the recording surface on an "air bearing," a thin layer of air which moves with the rotating disk. Although recording densities are generally enhanced by minimizing the thickness of this air bearing, often referred to as the glide height, glide heights which are too low may lead to excessive contact between the head and the disk surface, which can decrease the reliability of the recording system. To avoid a head crash (in which the data transfer head contacts and damages the disk), the disk drive system of the present system will generally position heads 32 on head load ramp 38 whenever the disk is rotating at insufficient velocity to maintain a safe glide height.

Referring now to FIGS. 6A–7C, arm 50 pivotally supports heads 32. When no cartridge is disposed in internal drive 20 and no power is supplied to voice coil motor 30, biasing springs of head retract linkage 40 and release linkage 36 urge arm 50 to a parked position on head load ramp 38. As cartridge 60 is inserted into the receptacle of internal drive 20, the cartridge actuates head retract linkage 40 so that the voice coil motor is free to pivot the arm from the parked position.

Cover springs 28 are manufactured or formed directly into the disk drive cover 24 and extend from the cover 24 toward the receptacle of internal drive 20 (see FIG. 2). Openings 27, preferably being opposed relative to an axis of insertion of the cartridge 60, are cut into housing cover 24 to define the spring structures. At least a portion of the cover material from the openings is not removed, but remains attached to the housing cover to provide the material for the springs. The cover material will typically be stainless steel or some other resilient material. To prevent the introduction of foreign elements into the internal disk drive through the openings, the openings can be subsequently covered with a plastic or similar material.

Figure 7C:
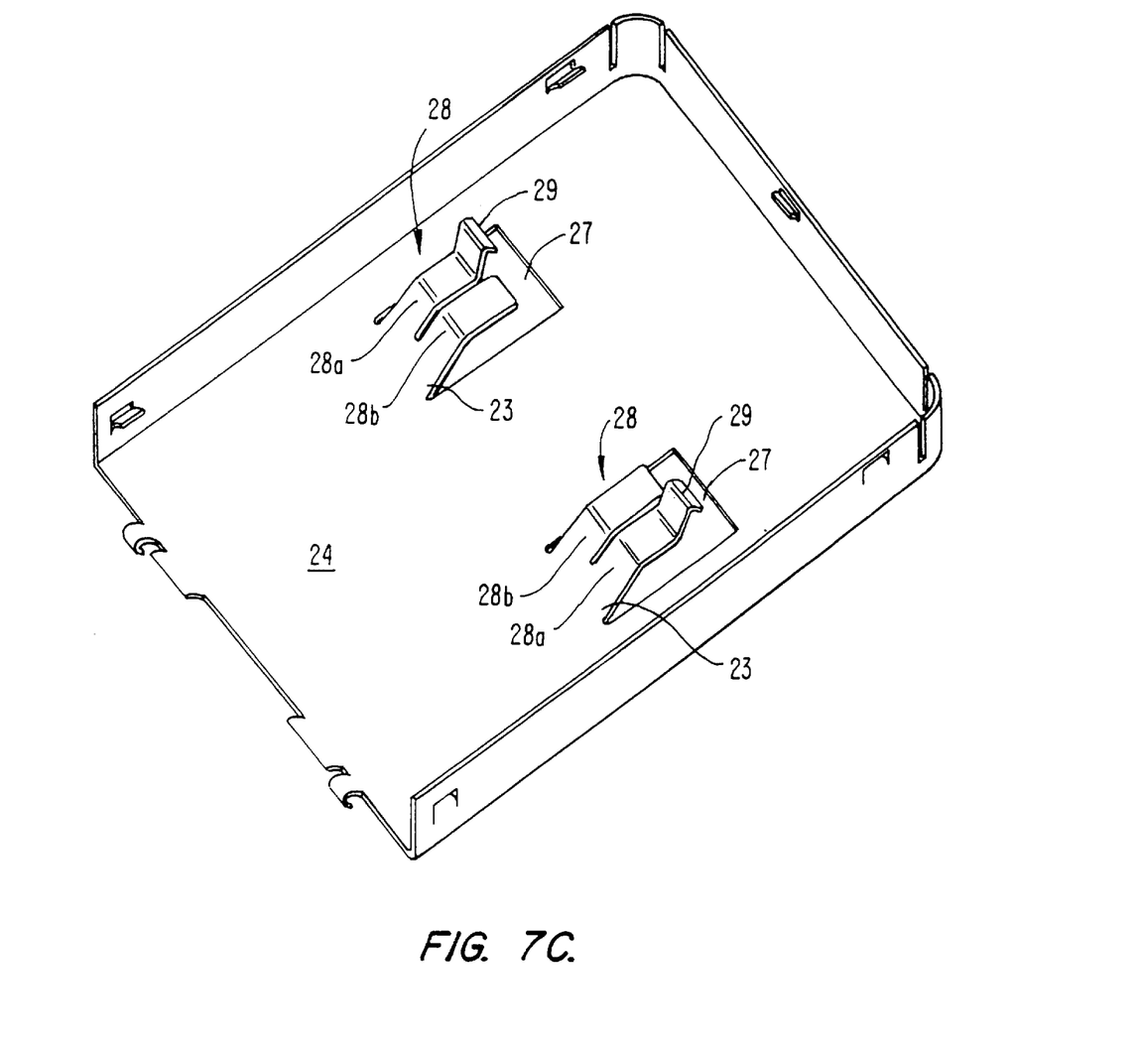
FIG. 7C is a perspective view of the disk drive housing cover, showing integral springs.

As shown in FIG. 7C, the cover material is split into two elongate strips 28a, 28b which extend in cantilever from the cover attach point 23 toward the receptacle. The springs preferably angle inward relative to the axis of insertion. Each spring 28 is adapted to slidingly engage the cartridge 60 to facilitate insertion and removal of the cartridge from the receptacle. Advantageously, the force applied by the springs 28 to the cartridge 60 will be no more than necessary to bias the cartridge toward the receptacle.

In a preferred embodiment, the elongate strips 28a, each have a protrusion 29 adjacent to the free end of the strips. This protrusion 29 is adapted to resist introduction of the cartridge 60 so that the two opposed springs promote even advancement of the cartridge relative to the axis of insertion.

Specifically, during insertion, cover springs 28 urge forward edge 62 of cartridge 60 downward, while rear edge 64 remains elevated (so long as the cartridge rides along rails 44). As cartridge 60 slides into the receiver, biasing spring 90, attached to head retract linkage 40 is tensioned. Biasing spring 90 is generally overcome manually during insertion of the cartridge.

Once cartridge 60 is inserted so that disk 66 is substantially aligned axially with spindle drive 34, rear side indentations 72 (see FIG. 3) allow rear edge 64 of the cartridge to drop downward below rails 44. This downward movement is opposed by base springs 94. These base springs generally comprise simple wire structures screwed or otherwise fastened to base 26, and the upward urging force imposed on cartridge 60 by the base springs is again manually overcome during insertion.

As base springs 94 are compressed against base 26, latch 46 slides into detent 70, so that the latch restrains cartridge 60 within the receiver of internal drive 20. Simultaneously, spindle drive 34 aligns with and engages the hub of disk 66, with centering alignment and driving engagement between the spindle drive and the disk generally being facilitated by a protruding, tapering nose on a magnetic chuck of the spindle drive and a corresponding counter sunk armature at the hub of disk 66.

As described hereinabove, the door of the cartridge opens automatically during insertion of the cartridge. Actuation of head retract linkage 40 during insertion also frees arm 50 to move heads 32 from head load ramp 38 to recording surfaces 92 along the major surfaces of disk 66.

While cartridge 60 is disposed within the receptacle of drive 20, the position of the cartridge is generally maintained by engagement between the surfaces of the cartridge and the stamped surfaces of base 26. More specifically, cover springs 28 and latch 46 hold cartridge 60 in contact with bosses 42, thereby ensuring alignment between the major surfaces of the cartridge and the disk drive structure. The fore and aft position of the cartridge is generally maintained by engagement between side rails 44 and rear indentation 72, with head retract linkage 40 biasing these two elements against each other. As described above, the sidewalls of base 26 fittingly receive side edges of cartridge 60, so that the position of the cartridge within the receptacle is substantially fully constrained. The tolerance of the positioning of the cartridge within drive 20 should be sufficient so that the disk within the cartridge is rotatable within the cartridge housing, and so that the heads (as supported by the head support structure) have free access to the recording surfaces of the disk.

As described above, cartridge 60 is held in the receiver of internal drive 20 by engagement of latch 46 with detent 70. Voice coil motor 30 may effect release of the cartridge by engagement between a tab of arm 50 and a corresponding tab on release linkage 36. Expulsion of the disk from the receptacle of internal drive 20 is effected after the disk has spun down with heads 32 safely parked along head load ramp 38. Voice coil motor 30 actuates release linkage 36 so as to disengage latch 46 from detent 70.

When the latch is disengaged, engagement between rails 44 and indents 72 initially prevents the cartridge from sliding along the plane of the disk. Instead, base springs 94 urge rear edge 64 of cartridge 60 upward, disengaging spindle drive 34 substantially axially from the hub of the disk. Once these driving structures are safely disengaged, biasing spring 90 of head retract linkage 40 urges cartridge 60 out of the receiver, and the head retract linkage also ensures that arm 50 is safely positioned with heads 32 along head load ramp 38. Generally, the biasing system will slide the cartridge rearward so that a portion of the cartridge extends from the drive, and so that the cartridge can be easily manually removed and replaced by the user.

While the exemplary embodiment has been described in some detail, by way of example and for clarity of understanding, a variety of modifications, changes, and adaptations will be obvious to those of skill in the art. Therefore, the scope of the present invention is limited solely by the appended claims.

What is claimed is:

1. A system for recording and archiving digital video and other data, the system comprising:

a cartridge having a hard recording disk;

a stationary spindle drive;

a disk drive having a receptacle which removably receives the cartridge, guide surfaces positioned to guide the cartridge from outside the disk drive to the receptacle, and a cover having at least one integral cover spring, the at least one integral cover spring and guide surfaces cooperating to direct the cartridge to an angled intermediate position so the cartridge pivotally enters the receptacle to directly engage the stationary spindle drive when the cartridge is manually pushed into the disk drive.

2. A system as claimed in claim 1, wherein the system is adapted for playing a movie.

3. The system as recited in claim 1, wherein the cartridge further comprises a forward edge, a rear edge and rear side indentations;

wherein the guide surfaces further comprise rails, such that the forward edge of the cartridge is forced downward into the receptacle under the urging of the cover spring while the rear edge of the cartridge is supported by the rails until the disk is substantially aligned with the spindle drive, wherein the rear side indentations allow the rear edge of the cartridge to drop downward below the rails under the force of the cover springs.

4. A disk drive for use with a removable hard disk cartridge, the disk drive comprising a fixed spindle drive and a housing having a receptacle which removably receives the cartridge, the housing having fixed guide surfaces which maintain the cartridge above the fixed spindle drive and a cover formed of a cover material, the cover having an opening which defines a cover spring of the cover material, the cover spring extending from the cover toward the receptacle so as to urge the cartridge downward into the receptacle from a first position when the cartridge is initially disposed within the housing, to an angled intermediate position, wherein the cartridge is pivotally movable in sliding engagement with the guide surfaces from the angled intermediate position within the housing to the receptacle so as to engage the fixed spindle drive.

5. A disk drive as claimed in claim 4, wherein the cover spring is adapted to slidingly engage the cartridge to facilitate insertion and removal of the cartridge from the receptacle.

6. A disk drive as claimed in claim 4, wherein the cover spring is comprised of an elongate strip, the cover spring extending in cantilever from the cover toward the receptacle.

7. A disk drive as claimed in claim 4, wherein the cover material comprises stainless steel.

8. A disk drive for use with a removable hard disk cartridge, the disk drive comprising a fixed spindle drive and a housing having a receptacle which removably receives the cartridge, the housing having a cover formed of a cover material, the cover having openings which define cover springs of the cover material, the cover springs extending from the cover toward the receptacle so as to urge the cartridge downward into the receptacle when the cartridge is disposed within the housing, wherein the cartridge is movable within the housing to engage the fixed spindle drive,     wherein the springs are adapted to slidingly engage the cartridge to facilitate insertion and removal of the cartridge from the receptacle,     wherein the cover springs are opposed relative to an axis of insertion of the cartridge, the springs having proximal ends adjacent a surrounding cover portion and distal ends which are spaced from the proximal ends and angle downwardly toward the receptacle to define protrusions, the protrusions extending into the receptacle to resist introduction of the cartridge so that the cover springs promote even advancement of the cartridge relative to the axis of insertion.

9. A disk drive as claimed in claim 8, wherein the openings each define a plurality of springs, and wherein the springs angle inward relative to the axis of insertion.

10. A system for recording and archiving digital data, the system comprising:

a removable hard disk cartridge having a forward edge, a rear edge and a hard disk;

a housing having a fixed receptacle, a fixed spindle drive and a plurality of cartridge guide surfaces, the guide surfaces constraining the cartridge to insertion along an insertion axis; and     a cover extending over the housing, the cover comprising a cover material and having an opening defining an integral cover spring of the cover material, the cover spring extends resiliently toward the receptacle so as to urge the cartridge from the insertion axis and urges the disk into an engagement axis to bring the disk into driving engagement with the fixed spindle drive during insertion of the cartridge into the receptacle;

bosses disposed in the receptacle which cooperate with the cover spring to ensure proper alignment with the fixed spindle drive, wherein during ejection of the cartridge from the receptacle the cover spring pivots the cartridge on the bosses to lift the rear edge of the cartridge out of the receptacle.

11. A disk drive as claimed in claim 10, wherein the guide surfaces slidingly receive the hard disk cartridge.

12. A disk drive as claimed in claim 11, wherein the insertion axis and engagement are substantially parallel.

13. A disk drive as claimed in claim 12, wherein the cover spring urges the cartridge to an intermediate position such that the forward edge is urged downward while the rear edge is supported by the guide surfaces.

14. The disk drive as claimed in claim 13, wherein the cartridge in the intermediate position defines an intermediate axis, wherein the intermediate axis and the insertion axis are non-parallel.

15. The disk drive as claimed in claim 10, further comprising a base spring mounted to the housing, wherein the base spring opposes the movement of the cartridge from the insertion axis to the engagement axis.

16. The disk drive as claimed in claim 15, wherein the base spring and the cover spring help disengage the cartridge from the spindle drive during ejection, the cover spring pivoting the cartridge about the bosses to lift the rear edge of the cartridge.

\* \* \* \* \*